(12) United States Patent
Park et al.

(10) Patent No.: US 7,099,494 B2
(45) Date of Patent: Aug. 29, 2006

(54) MOTION RECONSTRUCTION METHOD FROM INTER-FRAME FEATURE CORRESPONDENCES OF A SINGULAR VIDEO STREAM USING A MOTION LIBRARY

(75) Inventors: Min Je Park, Daejon (KR); Min Gyu Choi, Daejon (KR); Sung Yong Shin, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 693 days.

(21) Appl. No.: 10/287,354

(22) Filed: Nov. 4, 2002

(65) Prior Publication Data
US 2004/0017372 A1    Jan. 29, 2004

(30) Foreign Application Priority Data
Jul. 18, 2002   (KR) ............................... 2002-42008

(51) Int. Cl.
*G06K 9/00* (2006.01)
(52) U.S. Cl. ..................................... 382/107
(58) Field of Classification Search ................ 382/107, 382/228; 345/470, 473; 73/488; 348/154; 365/27
See application file for complete search history.

(56) References Cited

U.S. PATENT DOCUMENTS

| | | | | |
|---|---|---|---|---|
| 6,115,052 A | * | 9/2000 | Freeman et al. | 345/473 |
| 6,353,679 B1 | * | 3/2002 | Cham et al. | 382/228 |
| 6,614,429 B1 | * | 9/2003 | Zhang et al. | 345/420 |

* cited by examiner

*Primary Examiner*—Daniel Miriam
*Assistant Examiner*—ONeal R. Mistry

(74) *Attorney, Agent, or Firm*—Harness, Dickey & Pierce, P.L.L.C.

(57) ABSTRACT

The present invention relates to the motion reconstruction method from inter-frame feature correspondences of a singular video stream using a motion library.

The motion library is constructed through a motion capture system which is becoming more actively used or skilled animators.

The present invention comprises the detailed information on the whole processes from images to motions. These processes are very simple to implement and straight forward.

The total movement of a motion can be effectively inferenced and this technology can directly used for various fields in which human motions are produced from the images.

10 Claims, 5 Drawing Sheets

MOTION RECONSTRUCTION METHOD FROM INTER-FRAME FEATURE CORRESPONDENCES OF A SINGULAR VIDEO STREAM USING A MOTION LIBRARY

BACKGROUND OF THE INVENTION

The present invention relates to the motion reconstruction method from inter-frame feature correspondences. More particularly, the invention relates to the method of obtaining 3D motion information from a singular video stream by transforming the similar motions retrieved from a motion library and fitting them into the input image information.

Recently, the production of a virtual character animation using a motion capture technology is becoming very active.

The advantage of using the motion capture technology is that real motions can be produced in a fast and efficient way in comparison to the other conventional animation production methods.

Since the captured motion clips are short and generally related to particular characters or environments, there has been a continues development of various types of editing tools which recycle the captured motions for the production of new animations.

Based on these developed tools, animators can appropriately use the captured motions according to various requirement of the virtual characters and environments.

The monocular images captured by a camera is the most standard medium for storing the motions of a human and to date many researchers have been conducting experiments for various purposes in order to extract human motions from the monocular images.

There has been continues research activities on automatic reconstruction of motions from images based on an image analysis technology. In general, these researches rely on a probabilistic model for ascertaining the position of an articulated body.

Among the examples, Azarbayejani, et al (C. Wren, A. Azarbayejani, T. Darrel and A. Pentland. Pfinder: Real-time Tracking of the human body. IEEE Trans. Pattern Analysis and Machine Intelligence, 1991) proposed a method of real time tracking of a human body from the images obtained from one or plurality of cameras.

The above paper classifies a human body into a number of blobs and 3D location of a blob is tracked by the probabilistic model.

Bregler and Malik (C. Bregler and J. Malik. Estimation and tracking kinematics chains. In Proc. IEEE Conf. Computer Vision and Pattern Recognition, 1998.) expressed the kinematics of a multi-articulated body in terms of a twist and exponential basis. Based on this expression, the motions of a human body are inferenced from the images obtained from one or plurality of cameras.

Sminchisescu and Triggs (C. Sminchisescu and B. Triggs. Covariance scaled sampling for monocular 3D body tracking. In Proc. IEEE Conf. on Computer Vision and Pattern Recognition, 2001.) brought the attention to the difficulty of reconstructing images based 3D information due to the vagueness and occlusion. They attempted to obtain a nearest solution using an optimization method.

In order to avoid local minimum solutions during an optimization, the paper uses the covariance-scaled sampling method in conjunction with a numerical optimization method.

Also, it concentrated on some effective methods which are already known to some researchers for extracting a previously known 3D information from 3D feature information.

For example, Zheng and Suezaki (J. Y. Zheng and S. Suezaki. A model based approach in extracting and generating human motion. Proceedings of Fouteenth International Conference on Pattern Recognition, 1998.) proposed a model based method of capturing the motions of a multi-articulated body from monocular images.

The above paper disclosed the production method of 3D motions from total images by designating a number of key frames, obtaining 3D information from the key frames and storing them.

Rehg, et al (J. M. Rehg and T. Kanade. Visual tracking of high DOF articulated structures: an application to human hand tracking. European Conf. on Computer Vision, 1994.) attempted to reconstruct 3D information using a probabilistic approach that includes a kinematics model and limiting conditions of articulation angle as well as other limiting conditions.

Kakadiaris and Metaxas (I. Kakadiaris and D. Metaxas. Model-based estimation of 3D human motion with occlusion based on active multi-viewpoint selection. In Proc. IEEE Conf. Computer Vision and Pattern Recognition, 1996.) disclosed the method of obtaining a ratio for the given model from one piece of image using anthropmetry information.

Taylor (C. J. Taylor. Reconstruction of articulated objects from point correspondences in a single uncalibrated image. Computer Vision and Image Understanding, 2000.) disclosed the method of obtaining a detailed 3D information based on a previously known model using the foreshortening phenomenon which occurs from an image.

Liebowitz and Carlsson (D. Liebowitz and S. Carlsson. Uncalibrated motion capture exploiting articulated structure constraints. In Proc. 8th International Conference on Computer Vision, 2001.) disclosed the method of obtaining a detailed dynamic information of a multi-articulated body based on the images obtained from a plurality of uncalibrated cameras.

The above paper uses a limiting condition which states that the body ratio of a multi-articulated body is constant with respect to time.

Recently, a number of fresh attempts have appeared which shed a new light into the problem of motion construction.

For example, Howe, et al (N. R. Howe, M. E. Leventon, and W. T. Freeman. Bayesian reconstruction of 3D human motion from single-camera video. Cambridge Research Laboratory TR-CRL-99-37, 1999.) attempted to solve the problem of reconstructing 3D motions from monocular images using the relationship between 2D features formed by training and 3D positions.

The above paper claimed that the loss of depth information can be reproduced by using the above relationships.

Sidenbladh, et al (H. Sidenbladh, M. J. Black, and D. J. Fleet. Stochastic tracking of 3D human figures using 2D image motion. European Conference on Computer Vision, 2000.) obtained the patterns of human's walking motion through a training. By using these patterns, an attempted has made to reconstruct an arbitrary walking motion.

The common characteristic for this type of problems is that it regards the 3D motion tracking problems as an inference problem and approached them accordingly.

SUMMARY OF THE INVENTION

The above mentioned motion capturing process requires not only expensive hardware apparatus but also a performer who performs carefully according to the scenario under the given circumstances. This motion capturing technology can not be used for the purpose obtaining motions in natural and real situations such as a sports match or ball dance.

Also, the problem of reconstructing 3D motions from monocular images is very technologically demanding even for the state of the art today. Most of the existing researches are suitable for the purpose of reconstructing dynamic motions from the monocular images taken from various circumstances. Also the quality of 3D motions are not suitable for the production of animations.

Up to now no effective methods have been discovered for obtaining very dynamic and real motions of a human like articulated body which comprises more than 40 degrees of freedom from monocular images.

The object of the present invention is to provide the motion reconstruction method from inter-frame feature correspondences of a single video stream using a motion library in which the process of making motion from images involves a simple and straight forward time transformation step, articulation angle reconstruction step and top articulation position inferencing step.

DETAILED DESCRIPTION OF THE EMBODIMENTS

Hereinafter, preferred embodiments of the present invention will be described in detail with reference to the accompanying drawings.

First of all, the technological principle of the present invention will be explained prior to a detailed explanation of the present invention.

In order to reconstruct the motions of a human, a detailed 3D position information of a multi-articulated body should be obtained from 2D feature points such as articular position.

The biggest problem in the motion reconstruction from monocular images is the loss of depth information which occurs as 3D information is projected to 2D images.

Moreover, since there is no focus information of the camera used for capturing images and the camera itself might move with time, it is very difficult to obtain an absolute 3D trajectory of the performer in the video using only the image information.

The present invention proposes a new motion reconstruction method based on monocular image using a motion library.

It is assumed that the model information for a performer in an image, more specifically, the relative size ratio of each articulation and 2D feature points against the total images are known. Based on these information, a reconstruction is carried out by transforming the similar motions retrieved from a motion library and fitting them into the image information.

This approach requires the construction of a motion library which contains many motions similar to the motions to be reconstructed.

Theoretically, it is difficult to maintain and to perform a search through all the diversities of human motions in a library, hence, the motions associated with the objective of the present invention are assumed to be known.

For example, if various shooting motions of a soccer player were to be obtained, then a library of shooting motions should be constructed by obtaining a number of basic shooting patterns using a motion capturing method. Using this motion library, diverse and dynamic shooting motions in a real game can be reconstructed.

The followings are the detailed explanation of the present invention.

1. Constitution

Figure 1:
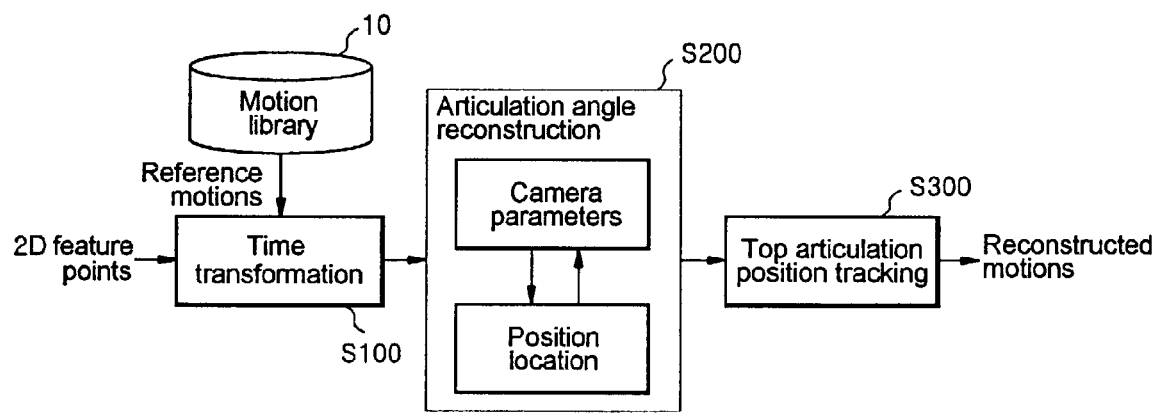
FIG. 1 shows a block diagram of the reconstruction according to the present invention.

FIG. 1 is a block diagram of the construction according to the present invention. One motion which is similar to the user's objective motion is selected from a motion library 10.

By referencing from the selected motions, the time correspondence relationship between the images and reference motions is established by transforming the reference motions along the time axis (S100).

Afterwards, the motion reconstruction process is carried out through a spatial transformation of the transformed reference motions using the 2D feature points obtained from the images.

Since the input images are assumed to be obtained from an uncalibrated camera which moves arbitrarily, the spatial location of the performer can not be obtained directly from these images.

Hence, after a relative location relationship is established between the locations obtained, when the articulation angle is projected to a 3D multi-articulated body, and 2D feature points which are given as an input, a method which produces appropriate top articulation movements are selected using the consecutive position information obtained as above, kinematics information from a number of images and dynamic information obtained from the reference motions (S300).

In order to establish a time correspondence relationship between the input images and reference motions, first of all, a number of keytimes, in which a mutual reaction between a performer and the given environment exists, are assigned through a conversation method.

When the reference motions are transformed along the time axis based on the assigned keytimes, a process, which parameterizes the reference motions which makes the keytimes of the reference motions to coincide to the assigned keytimes in the images, is carried out.

These transformed reference motions are assigned as an initial estimated value of the objective motions.

In order to obtain a relative 3D position information of a top articulation position, a kinematical limiting conditions should be set in order to make the location of projected articulations of a 3D multi-articulated body to coincide to 2D feature points.

Since several 3D positions can exist which satisfy the above general limiting conditions, an objective function, which can select the most similar motions to the reference motions, is used.

The undetermined variables such as camera parameters and articulation angles can effectively and simultaneously be obtained using the present invention.

Also, in order to maintain the softness of reconstructed motions, the noise removal process is carried out by using a motion displacement map and multi-level B-spline interpolation (S. Lee, G. Wolberg, and S. Y. Shin. Scattered data interpolation with multilevel B-splines. IEEE Trans. Visualization and Computer Graphics, 1997.).

After calculating the difference between the reference motions and reconstructed articulation angles for each of the frames, a multilevel B-spline interpolation nearest to this difference is obtained. This value is selected as a motion displacement map. Using this motion displacement map, the reference motions are transformed to produce the final motions.

Finally, the reconstruction process is completed by inferencing the trajectory of the top articulation angle.

This reconstruction process is carried out by classifying the motions into two different types.

The first case is when a mutual reaction between a performer and its surrounding environment exists. In this case, the mutual reaction with the environment which appears in the images by transforming the top articulation position information of the reference motions, more specifically, the top articulation position that satisfies the kinematical relationship is transformed.

Even in this process, the final motions are produced by calculating the top articulation position displacement for each frame with a mutual reaction and by producing a soft multilevel B-spline interpolation curve which connects all the displacement values in the total frame.

The second case is when there is no mutual reaction. In this case, the top articulation position trajectory of the final motions are produced by using the dynamic characteristics of the reference motions.

Especially, if a multi-articulated body is regarded as a collection of rigid bodies, the trajectory of the center of gravity under the influence of gravity only without a mutual reaction can be shown to be a soft parabola.

Using these observed information, the final motions are produced by making the center of gravity trajectory of the objective motions to be similar to those of the reference motions.

2. Time Transformation (S100)

The motion is a function which determines the position of a multi-articulated body with respect to time.

In case of a multi-articulated body with n number of articulations, arbitrary motions can be represented by mathematical equation 1.

$$m(t)=(p_1(t),q_1(t),\ldots,q_n(t))^T \quad \text{[Mathematical Equation 1]}$$

Here, $p_1(t) \in R^3$ and $q_1(t) \in S^3$ represent the location and direction of the top articulation position and $q_i(t) \in S^3$ represent the direction information of $i(2 \leq i \leq n)^{th}$ articulation.

Also, the collection of feature points fed by the images as an input are represented by mathematical equation 2.

$$\overline{m}(t)=(\overline{p}_1(t),\ldots,\overline{p}_n(t))^T \quad \text{[Mathematical Equation 2]}$$

Here, $\overline{p}_1(t) \in R^2$ represent the image location at $i(1 \leq i \leq n)^{th}$ projected articulation and $\overline{m}(t)$ means the projected information of an objective motion m(t) at time t.

Here, in order to coincide the given reference motion m(t) with the feature points $\overline{m}(t)$, the reference motion should be parameterized again with the time axis.

In general, the dynamic time warping method is used for controlling the time relationship between two different non-continuos sample signals.

However, using the dynamic time warping method for establishing the time relationship between two different signals without the present camera information is very difficult since the two signals have two different dimensions.

In order to resolve this problem, the present invention utilizes a collection of keytimes which are established by the users in the input images and reference motions.

The keytimes are a collection of points on which the user starts or finishes mutual reactions with the surrounding environment in the images and reference motions.

For example, with respect to a walking motion, the keytimes will be the moments when the person's foot touches the ground and leaves the ground. With respect to a shooting motion in a soccer match, the most important keytime will be when the player's foot strikes the ball.

These keytimes can easily be established through not only in the input images but also in the reference motions.

After establishment of keytimes, the process of producing motions which most closely coincide with the collection of keytimes for the input images should be carried out by transforming the reference motions with the time axis again.

With respect to ith articulation, if we assume that each of $K_i=\{t_{i,1},\ldots,t_{i,c}\}$ and $\overline{K}_i=\{\overline{t}_{i,1},\ldots,\overline{t}_{i,c}\}$ are collection of keytimes defined in the input images and reference motions, the parameter of the reference motions m(t) are transformed by mathematical equation 3 in order to transform the reference motions in such a way that Ki and $\overline{K}_i$ coincide for all i.

$$t'(t) = \overline{t}_{i,k} + \left(\frac{\overline{t}_{i,k+1} - \overline{t}_{i,k}}{t_{i,k+1} - t_{i,k}}\right)(t - t_{i,k}), \quad \text{[Mathematical Equation 3]}$$

$$t_{i,k} \leq t \leq t_{i,k+1}$$

Here, t and $t'$ represent the original parameter and transformed parameter of the reference motions respectively.

Figure 2:
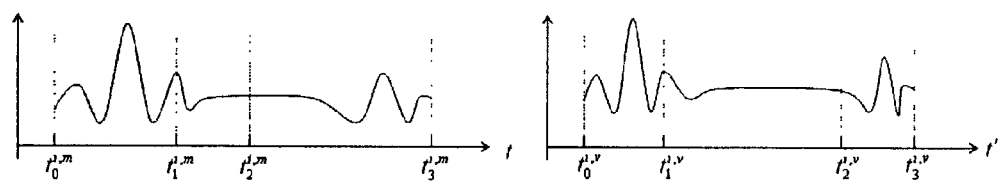
FIG. 2 shows a time transformation graph of the reference motions using keytimes according to the present invention.

FIG. 2 shows the same process in case of a single articulation and the left represents the keytimes and rotation values of articulations in the reference motions and the right represents the keytimes and rotation values of articulations in the images.

The each curve represented in FIG. 2 is one of the elements of unit quaternion that shows the direction information of articulations with respect to time.

In general, since a human type multi-articulated body possesses a number of articulations with mutual reactions, this process is repetitively carried out for all articulations with the defined mutual reactions.

Figure 3:
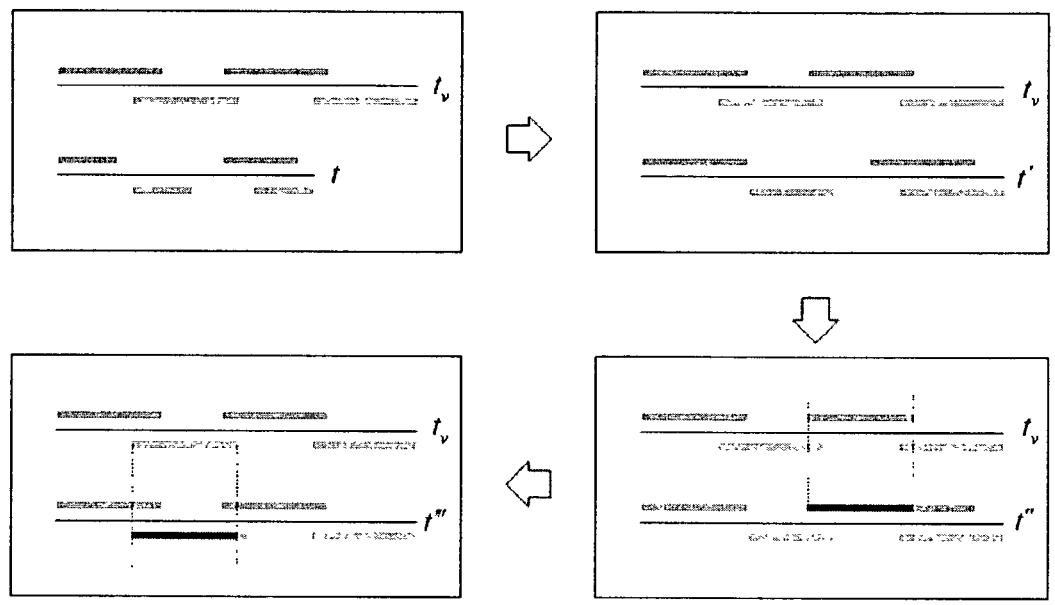
FIG. 3 shows a diagram which shows a time transformation of more than two articulations according to the present invention.

FIG. 3 is a diagram which shows a time transformation of more than two articulations. A different keytime is represented using a bar with different brightness.

The left foot (bright color) and right foot (dark color) are represented and each of the top line and bottom line represent an axis for images and time respectively.

According to the order of the sequence, it represents the keytimes for the images and reference motions→resampling against the total time→resampling against the right foot.

3. Reconstruction of Articulation Angle 3-1 Kinematically Limiting Conditions

In all frames, the projected location of a multi-articulated body to the image face should coincide with the feature points of the input images.

It is difficult to directly determine the trajectory of top articulation position from the images since the input images are not obtained from an uncalibrated camera with an arbitrary trajectory and a referenced body, from which the location of performer can be calculated, does not always exist.

According to the present invention, the articulation angles are determined through a process that involves matching the relative location of articulations in reference to the top articulation position.

In this case, the position of a multi-articulated body $x(t) = m|p1(t) = 0_3$ becomes $x(t) = (0_3, q_1(t), \ldots, q_n(t))^T$.

In order to provide an articulation position of the multi-articulated body which is projected to the images, a camera model is required.

In general, the camera model with a full degree of freedom can be represented by mathematical equation 4.

$$c = (t_x, t_y, t_z, r_x, r_y, r_z, \alpha, f)$$ [Mathematical Equation 4]

Here, each of $(t_x, t_y, t_z)$ and $(r_x, r_y, r_z)$ represent the location and direction of a camera and $\alpha$ and $f$ represent the vertical and horizontal ratio and focal distance respectively.

If the camera is assume to be facing the top articulation position of a performer, then the coordination of the camera can be represented in terms of the distance between the performer and camera, and direction information.

A simplified model for the camera used in the present invention can be represent as mathematical equation 5.

$$c = (r_x, r_y, r_z, \gamma)$$ [Mathematical Equation 5]

Here, $\gamma$ is a ratio between the focal distance and distance between a performer and camera.

The simplified model in mathematical equation 5 is sufficient for the purpose of coinciding the feature points of the input images and projected articulation location by controlling the relative location of articulations in reference to the top articulation position.

The method of inferencing the top articulation trajectory in order to obtain the total movement of the performer will be explained later.

The kinematically limiting conditions of a multi-articulated body based on the camera parameters can be represented by mathematical equation 6.

$$\|\bar{p}_i(t) - P_c f_i(x(t))\| = 0$$ [Mathematical Equation 6]

Here, $f_i(\bullet)$ is a forward kinematics function for $i^{th}$ articulation and $Pc$ is a projection transformation series consisted of camera parameter $c$.

3-2 Objective Function

Since the number of kinematically limiting conditions is less than the number of degree of freedom in a multi-articulated body, there are a number of positions in the multi-articulated body that satisfies the kinematically limiting conditions.

DiFranco, et al (D. E. Difranco, T. J. Cham, and J. M. Rehg. Recovery of 3D articulated motion from 2D correspondences. Cambridge Research Laboratory TR-CRL-99-7, 1999.) proposed that vagueness of depth information can be resolved by introducing additional limiting conditions such as a motion of articulation angle.

However, there are still many indeterministic variables for obtaining 3D information from 2D information even with the additional limiting conditions.

According to the present invention, in order to obtain the best position information a reference motion information is used.

Since the reference motions are similar to an objective motions in the images, by selecting an articulation angle with the least difference ensures naturalness of the final motions.

Hence, a position $x(t)$ which minimizes an objective function in mathematical equation 7 should be ascertained.

$$g(x(t)) = \text{dist}(x^r, x(t))$$ [Mathematical Equation 7]

Here, $x(t)$ is a position information consisted of reference motions and articulation angles with respect to time $t$ and $\text{dist}(\bullet)$ is a function which specifies the difference between two different directions.

$$\text{dist}(x^r(t), x(t)) = \sum_{i=1}^{n} \|\ln((q_i(t))^{-1} q_i^r(t))\|^2$$ [Mathematical Equation 8]

Here, $\ln(\bullet)$ is a logarithm map against unit quaternion (K. Shoemake. Animating rotation with quaternion curves. Computer Graphics (Proceedings of SIGGRAPH 85), 1985.)

3-3 Method of Obtaining the Solutions (Articulation Reconfiguration)

The problem of obtaining articulation angles can be summarized as obtaining a position $x(t)$ which minimizes the objective function $g(\bullet)$ under the given kinematical limiting conditions.

If mathematical equation 8 is changed into a form without the limiting conditions, then the equation becomes mathematical equation 9.

$$g(x(t)) = \sum_{i=1}^{n} \left( \|\bar{p}_i(t) - P_c f_i(x(t))\|^2 \right) + \omega \text{dist}(x^r(t), x(t))$$ [Mathematical Equation 9]

Here, $\omega$ is a weight value for adding two different objective functions.

The first term of mathematical equation 9 shows an articulation angle difference when the feature points of the input images are projected to a 3D multi-articulated body and the second term shows the difference between the final articulation angles and the articulation angles of the reference motions.

In order to solve this minimization problem, the conjugate gradient method is used (W. H. Press, Saul A. Teukolsky, W. T. Vetterling, and B. P. Flannery. Numerical recipes in C: The art of scientific computing. Cambridge University Press, 1992.).

The reason for the difficulty in solving mathematical equation 9 is that a camera information e is also included as a single equation along with the detailed information x(t).

A standard optimization problem such as the conjugate gradient method exhibits the best quality when an objective function is in the form of a quadratic equation.

Hence, according to the present invention, a good convergence is obtained by treating two different parameters independently during the optimization process.

Figure 4:
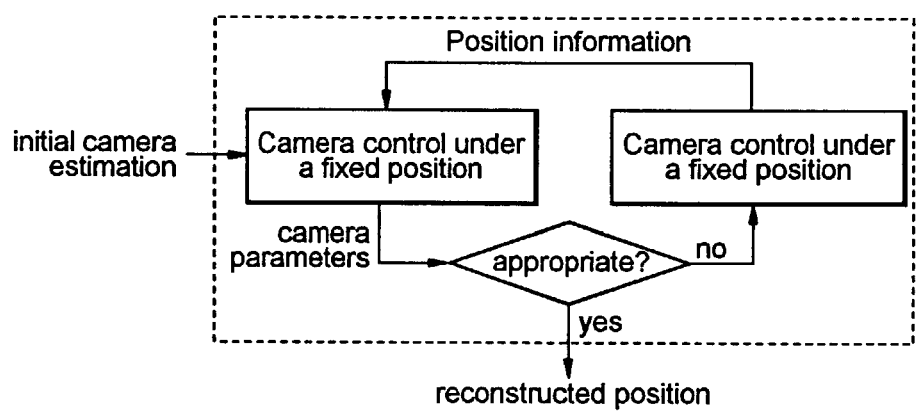
FIG. 4 shows a block diagram for ascertaining the articulation angles and camera parameters according to the present invention.

The one of the two parameters is fixed while the other is being derived. FIG. 4 is a block diagram which shows the repeated calculation method for ascertaining articulation angles and camera parameters.

The optimization process using a numerical analysis, the first estimated value is very important for getting a good result.

The reconstruction process according to the present invention a time transformed reference motions can always be a good first estimated value for getting the objective articulation angles.

Since the camera model according to the present invention has four parameters, the first estimated value of camera parameters can be calculated, first, selecting 3 points which exist on a same plane at the hip of an articulated body, second, conducting a least square approximation of the three points.

3-4 Motion Smoothing

In practice, it is very difficult to accurately track the locations of articulations from the streamed video without any displaying apparatus attached to the performer.

Also, the values of the reconstructed articulation angles have jerkiness due to the input feature points that contains noisy.

In order to reduce this jerkiness, a motion displacement map is used in conjunction with a multi-level B-spline interpolation.

The motion displacement map represents the difference between two different motions.

The motion displacement map $d(t)=x(t) \ominus x^r(t)$ which shows the difference between the position information xr(t) and reconstructed position information x(t) can be defined as mathematical equation 10.

$$d(t) = \begin{bmatrix} 0_3 \\ v_1(t) \\ \vdots \\ v_n(t) \end{bmatrix} = \begin{bmatrix} 0_3 \\ q_1(t) \\ \vdots \\ q_n(t) \end{bmatrix} \ominus \begin{bmatrix} 0_3 \\ q_1^r(t) \\ \vdots \\ q_n^r(t) \end{bmatrix}$$

$$= \begin{bmatrix} 0_3 \\ \ln((q_1^r(t))^{-1} q_1(t)) \\ \vdots \\ \ln((q_n^r(t))^{-1} q_n(t)) \end{bmatrix}$$

[Mathematical Equation 10]

Here, $v_i(t) \in R^3$ is a rotation vector of $i(1 \leq i \leq n)^{th}$ articulation. Accordingly, a new position can be calculated by adding a motion displacement map with the reference motions $x(t)=x^r(t) \oplus d(t)$.

$$x(t) = \begin{bmatrix} 0_3 \\ q_1^r(t) \\ \vdots \\ q_n^r(t) \end{bmatrix} \oplus \begin{bmatrix} 0_3 \\ v_1(t) \\ \vdots \\ v_n(t) \end{bmatrix}$$

$$= \begin{bmatrix} 0_3 \\ q_1^r(t)\exp(v_1(t)) \\ \vdots \\ q_n^r(t)\exp(v_n(t)) \end{bmatrix}$$

[Mathematical Equation 11]

From an articulation angle displacement d(t) of the frame number i, a soft motion displacement map d(t) which approximates d(i) for all i can be obtained from the multi-level B-spline interpolation.

Unlike the local B-spline interpolation, a good approximation of the total shape and local characteristics can be obtained using the multi-level characteristics of the multi-level B-spline interpolation.

Basically, the approximation error on a thin level is propagated to the whole frames and it is later controlled at a more accurate level.

Hence, the knot array which corresponds to the thinnest level provides a rough approximation on the total shape and afterwards a close approximation can be obtained using B splines which have a more accurate knot array.

By adding d(t) to the reference motions, the position information xc(t) which is consisted of the final articulation angles can be obtained using mathematical equation 12.

$$x^c(t) = x^r(t) \oplus d(t)$$

[Mathematical Equation 12]

Figure 5:
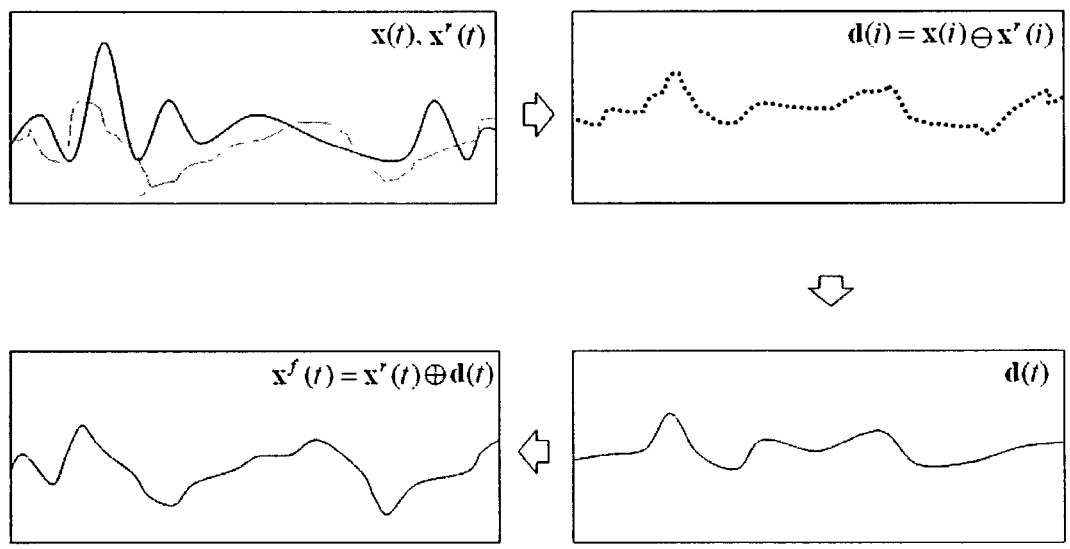
FIG. 5 shows the process of motion smoothing against the reconstructed articulation angles according to the present invention.
Figure 6:
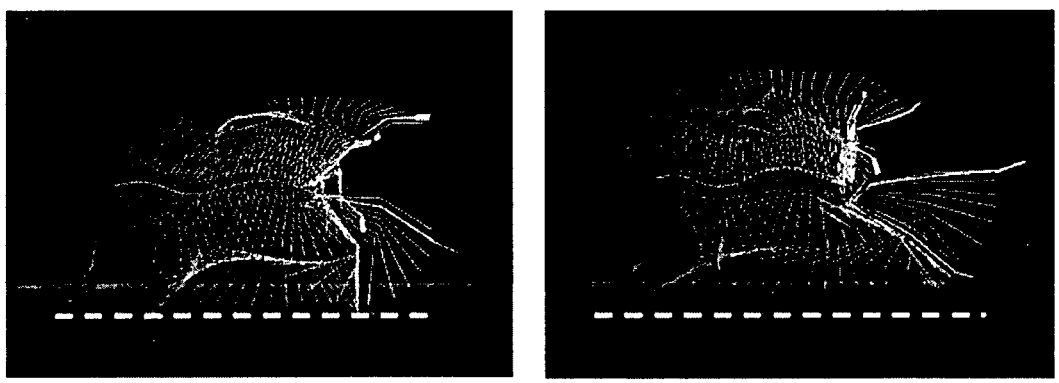
FIG. 6 is a diagram which shows some problems that might occur when the top articulation information of the reference motions are used.

This process is explained in FIG. 5 which shows a process of motion smoothing against the reconstructed articulation angles.

Each of the curves in FIG. 5 represents a value of unit quaternion. According to its order, it represents the reference motion and reconstructed articulation rotating angle→the difference of articulation rotating angle→the difference of smoothed articulation rotating angle→the final articulation rotating angle.

According to a properly selected knot array interval, an approximation process can approximates noisy added inputs into a desired accuracy level for smooth movements.

4. Inferencing of Top Articulation Position (S300)

The final motion m(t) can be obtained by adding xc(t) to motion displacement map $d(t)=(p_1(t), 0_3, \ldots, 0_3)^T$ which lists the top articulation position information.

Here, $p_1(t)$ is the top articulation position trajectory represented in a global coordinate.

Since the movements were estimated according the performer using uncalibrated cameras, it is difficult to ascertain a top articulation position information in the images. Hence, the top articulation position trajectory obtained using the kinematics limiting conditions and characteristics of reference motions.

The first case is when a mutual reaction exists. A walking motion can be regarded as a typical first case since the feet of a performer touches the ground.

The second case is when no mutual reaction exists. A running motion can be regarded as a typical second case.

4-1 When a Mutual Reaction Exists with the Surrounding Environment.

When a kick motion of a soccer player is examined, the top articulation position trajectory of the reference motion (left picture) is very different since the reconstructed motion (right picture) is very dynamic.

Hence, after applying the kinematics limiting condition which states that a jumping foot should touch the ground to the top articulation of the reference motion and the height should be changed.

After calculating the distance between the jumping feet and the surface of the ground in the motion $m(t)=x^c(t) \oplus (p^r_t(t), 03, \ldots, 03)^T$ for all i under the limiting conditions and producing the motion displacement map d(I) using the multi-level B-spline interpolation, the final motions are produced using the interactive motion editing method (J. Lee and S. Y. Shin. A hierarchical approach to interactive motion editing for human-like figures. Computer Graphics (Proc. SIGGRAPH '99), 1999.) using $m(t)=x^c(t) \oplus (d(t), 03, \ldots, 03)^T$ as a initial estimated value.

Here, $x^c(t)$ and $p^r_t(t)$ are the reconstructed articulation angles and time transformed reference motions of top articulation trajectory respectively.

4-2 When No Mutual Reaction Exists with the Surrounding Environment

Unlike the case explained as above, there exists no mutual reaction with the surrounding environment in case of a jumping motion.

In this case, the top articulation trajectory of the objective motion is produced using the dynamic characteristics of the reference motions.

If a multi-articulated body is assumed to be a collection of rigid bodies, then the center of gravity trajectory of the multi-articulated body when under the influence of gravity only without a mutual reaction can be shown to be a soft parabola.

The center of gravity trajectory of the reference motions can be represented as mathematical equation 13.

$$cog^r(t) = p^r_1(t) + \frac{\sum_{i=1}^{n} m_i \tilde{p}^r_i(t)}{\sum_{i=1}^{n} m_i} \quad \text{[Mathematical Equation 13]}$$

Here, $p^r_i(t)$ $(1 \leq i \leq n)$ and $m_i (1 \leq i \leq n)$ represent a relative location vector and weight of top articulation position pi(t) to ith articulation location respectively.

As explained above, since the reference motions are partial linearly time transformed according to the time, the center of gravity trajectory of the objective motions can also be partial linearly time transformed according mathematical equation 13.

$$cog(t) = s \ cog^r(t) = p(t) + \frac{\sum_{i=1}^{n} \tilde{p}_i(t)}{\sum_{i=1}^{n} m_t} \quad \text{[Mathematical Equation 14]}$$

Here, S and $p_i(t)$ $(1 \leq i \leq n)$ represent a scaling factor and relative location of ith articulation of the objective motion from the top articulation position for time transformation respectively.

$p_i(t)$ can be obtained from a reconstructed articulation angle xc(t). Accordingly, the final top articulation position $p_t(t)$ can be obtained from mathematical equation 15 using mathematical equation 13 and mathematical equation 14.

$$p_1(t) = s \ p^r(t) + s \left( \frac{\sum_{i=1}^{n} m_i (\tilde{p}^r_i(t) - \tilde{p}_i(t))}{\sum_{i=1}^{n} m_i} \right) \quad \text{[Mathematical Equation 15]}$$

Figure 7:
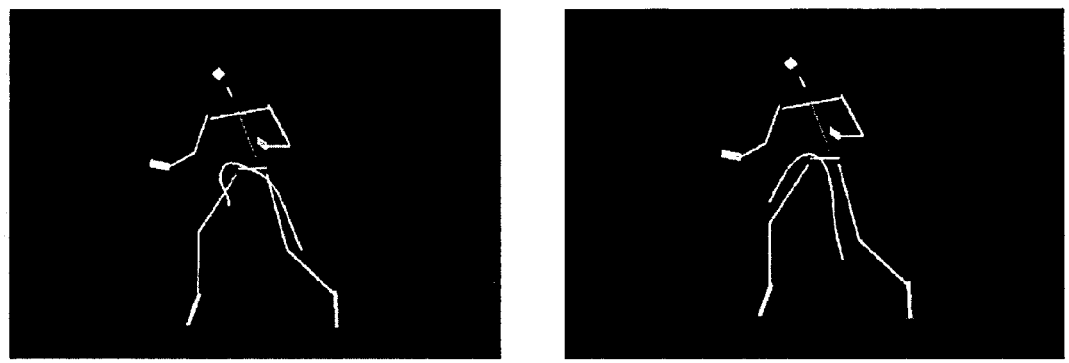
FIG. 7 is a diagram which compares the center of gravity trajectory when the dynamic characteristics are not considered.

As can be seen from FIG. 7, the center of gravity trajectory of the reconstructed motion (right picture) obtain from the previously mentioned method is a soft parabola.

5. Experimental Results

Hereinafter, the experimental results of a shooting motion of the foot and heading motion will be explained according to the reconstructed images of the present invention.

The human model utilized in the experiment has 40 degrees of freedom including 6 for location and direction of top articulation position, 3 for chest and neck and 7 for hands and feet.

The motion clipping used in the reference motions are sampled at 60 Hz and the keytimes are directly assigned.

The used video is a standard video commonly used in public broadcasting and the locations of keytimes and feature points are directly assigned.

Table 1 (motion library comprising reference motions) shows the types of captured motions for the experiment.

TABLE 1

| category (kicks) | ball placement | | | | category (headings) | head direction | | |
|---|---|---|---|---|---|---|---|---|
| | place | volley(h)† | volley | sliding | | front | left | right |
| instep | ○ | ○ | ○ | — | stand | ○ | ○ | ○ |
| inside | ○ | ○ | — | ○ | jump (single foot) | ○ | ○ | ○ |
| outside | ○ | ○ | ○ | ○ | jump (both feet) | ○ | ○ | ○ |
| toe | ○ | — | — | — | stand back | ○ | ○ | ○ |
| hill | ○ | — | — | — | jump back | ○ | ○ | ○ |
| overhead | — | — | ○ | — | | | | |
| cut | ○ | — | — | — | | | | |
| turning | ○ | — | — | — | | | | |

For the shooting motions in a soccer game, the motions in the table 1 are sufficient.

Table 1 represent the shooting motions (♣means a half volley) of a soccer player, these motions are classified into relative positions of the foot and head with respect to the position of the ball.

Each of the motion clips is captured by an optical capturing equipment and the duration is about two to three seconds.

The suggested reconstruction method is implemented by TGS OpenInventor™ which provides a C++ 3D graphics interface under MS Windows XP™.

The experiment is carried out by a personal computer with a 512MB main memory based on PentiumIV™.

5-1. Shooting Motion by a Foot

Figure 8:
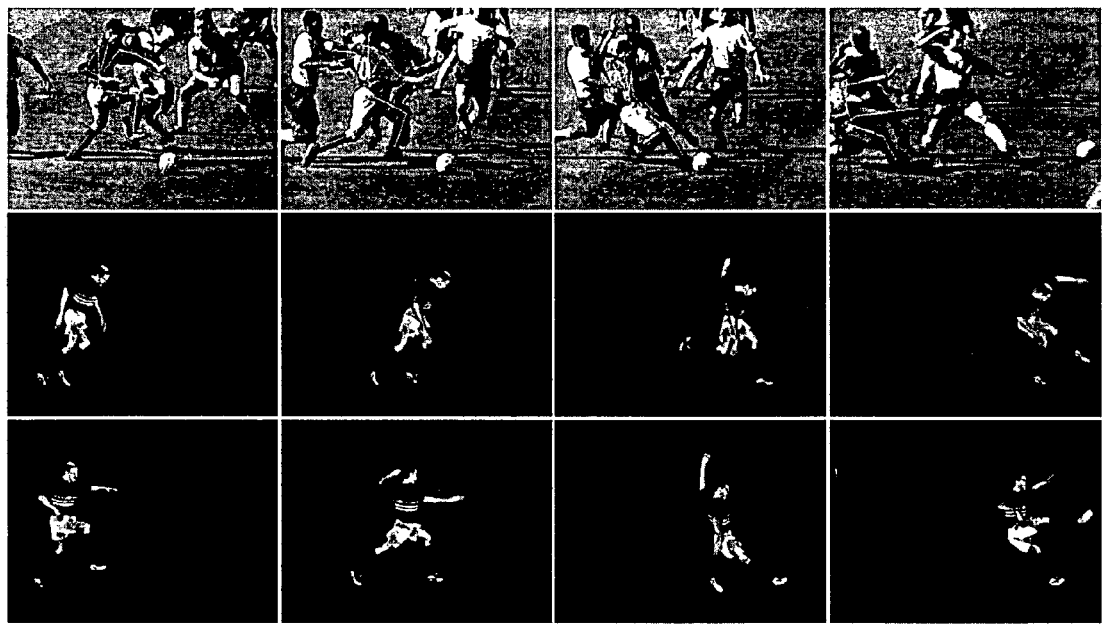
FIG. 8 shows the reconstruction of a shooting motion according to the present invention.

FIG. 8 shows the reconstruction of a shooting motion by a soccer player using the library motion 'place instep kick' in Table 1.

The top is an input image which shows the feature points, the middle is the reference motions and the bottom is reconstructed motions.

The used image clips consist of 51 frames and the camera is placed on the right hand side of the performer.

The number of keytimes assigned here are four for left foot and two for right foot. Table 2 (error analysis data) show errors from the relative location difference with respect to the top articulation position like shown in mathematical equation 16.

The top is an input image, the middle is the reference motions and the bottom is reconstructed motions.

The used image clips consist of 37 frames and the camera is placed at the rear of the performer.

The number of keytimes assigned here are two for each foot and one for the head. Since the total motion corresponds to a jumping motion, the trajectory of top articulation is produced by using the center of gravity trajectory of the reference motions.

As explained so far, the present invention comprises a detail information on the total processes from images to motions. These processes which comprise a plurality of steps are very simple to implement and straight forward. Especially the total movement of a motion can be effectively inferenced.

Using the present invention, first, the dynamic movement of players in a sports game can effectively obtained, hence, the present invention can be used for constructing replaying sporting motions. Second, similar but diverse human motions can easily be produced from a few captured motions, hence, the production cost, i.e., animation production can be reduced.

What is claimed is:

1. A motion reconstruction method from inter-frame feature correspondences of a singular video stream using a motion library, comprising:

a time transformation step which selects objective motions and similar motions (reference motions) from

TABLE 2

|  | kick motion (51 frames) | | | heading motion (37 frames) | | |
| --- | --- | --- | --- | --- | --- | --- |
|  | min. | max. | avg. | min. | max. | avg. |
| original | 0.0331 | 0.3049 | 0.1040 | 0.0116 | 0.1918 | 0.0846 |
| timewarped | 0.0272 | 0.1624 | 0.0915 | 0.0100 | 0.1397 | 0.0710 |
| reconstructed (knot spacing:1) | 0.0011 | 0.0100 | 0.0043 | 0.0005 | 0.0100 | 0.0051 |
| reconstructed (knot spacing:4) | 0.0013 | 0.0227 | 0.0088 | 0.0008 | 0.0159 | 0.0058 |

Table 2 shows the maximum, minimum and average error values against all frames and these errors were measured by a standard coordinate in the range [−1.1].

$$e(t) = \sum_{i=1}^{n} \|\bar{p}_i(t) - P_c f_i(x^c(t))\|^2$$ [Mathematical Equation 16]

Here, $\bar{p}_i(t)$ and $x^c(t)$ represent 2D feature points indicated in 3D location and images of $i^{th}$ articulation.

As can be seen from Table 2, the time transformation process can significantly minimize the maximum errors in the total frame.

Due to the noises on the time frame of hand picked 2D feature points, when the motion smoothing is carried out by a multi-level B-spline interpolation with the minimum knot interval value of 4, the total motion can be soft and lie within of the error range.

The total reconstruction time including the hand operation is about 30 minutes.

5-2 Goal Scoring with a Head Motion

Figure 9:
FIG. 9 shows the reconstruction of a heading motion according to the present invention.

FIG. 9 shows the reconstruction of a heading motion by a soccer player using the library motion 'left jump heading with both feet' in Table 1.

the motion library that contains various motion information, and transforms the time correspondence between the reference motions and input images using the time axis of the reference motions;

an articulation reconstruction step which ascertains the articulation angles and makes the relative location relationship between the 2D feature points obtained from said input images and articulation angles to coincide;

a top articulation position inferencing step which produces an appropriate top articulation movement from the continuous position information obtained from said above steps, kinematics information obtained from the input images and dynamical information obtained from said reference motion;

wherein keytimes comprising a collection of points on which the user starts or finishes mutual reactions with the surrounding environment in the images and reference motions are assigned by the user in the input images and reference motions are used; and wherein when said collection of keytimes defined in the input images and reference motions are, $K_i = \{t_{i,1}, \ldots, t_{i,c}\}$ and $\overline{K}_i = \{\bar{t}_{i,1}, \ldots, \bar{t}_{i,c}\}$ for ith articulation, the parameters of the reference motions m(t) are transformed by mathematical equation 17

$$t'(t) = \bar{t}_{i,k} + \left(\frac{\bar{t}_{i,k+1} - \bar{t}_{i,k}}{t_{i,k+1} - t_{i,k}}\right)(t - t_{i,k}),$$ [Mathematical Equation 17]

$t_{i,k} \leq t \leq t_{i,k+1}$.

2. The method as claimed in claim 1, wherein the use of said keytimes are for producing motions which are most similar to a collection of keytimes of the input images by transforming the reference motions by the time axis.

3. The method as claimed in claim 1, wherein when the motion has a mutual reaction with the surrounding environment in said top articulation position inferencing step, the height is changed after applying the kinematics limiting conditions to the top articulation of the reference motion.

4. The method as claimed in claim 1, wherein when the motion has no mutual reaction with the surrounding environment in said top articulation position inferencing step, the final top articulation position of the objective motion is obtained by mathematical equation 21 using the dynamical characteristics of said reference motion;

$$p_1(t) = sp^r(t) + s\left(\frac{\sum_{i=1}^{n} m_i(\tilde{p}_i^r(t) - \tilde{p}_i(t))}{\sum_{i=1}^{n} m_i}\right)$$

here, S and $p_i(t)$ ($1 \leq i \leq n$) represent a scaling factor and relative location of ith articulation of the objective motion from the top articulation position for time transformation respectively.

5. A motion reconstruction method from inter-frame feature correspondences of a singular video stream using a motion library, comprising:
a kinematically limiting conditions assigning step which makes the location of projected articulation of a 3D multi-articulated body to coincide to the 2D feature points;
an objective function minimization step which minimizes the objective function by selecting the motions that are most similar to the reference motions;
an articulation reconstruction step that ascertains the position shapes which minimizes the objective function under the kinematically limiting condition; and
a smoothing step that calculates the difference between said reference motions and articulation angles which are reconstructed for each frame, selects a motion displacement map by getting an approximation using the multi-level B-spline interpolation and transforms the reference motions using said motion displacement map to get the final motion.

6. The method as claimed in claim 5, wherein said kinematically limiting conditions can be represented by mathematical equation 18 when based on camera parameters;

$$\|\bar{p}_i(t) - P_c f_i(x(t))\| = 0$$ [Mathematical Equation 18]

Here, fi (•) is a forward kinematics function for ith articulation, Pc is a projection transformation array consisted of a camera parameter c and
is the location of projected articulation image for ith articulation.

7. The method as claimed in claim 6, wherein said parameter c is represented by camera direction and focal distance ($r_x$, $r_y$, $r_z$, $\gamma$) respectively.

8. The method as claimed in claim 5, wherein position x(t) is obtained by minimizing the objective function in mathematical equation 19;

$$g(x(t)) = \text{dist}(x^r, x(t))$$ [Mathematical Equation 19]

Here, xr(t) is a position information consisted of the reference motions and articulation angles at the time t, and dist(•) is a function which represent the distance between two different directions.

9. The method as claimed in claim 5, wherein said minimization problem is solved by the conjugate gradient method in which one of the two parameters is fixed while the other is being derived.

10. The method as claimed in claim 5, wherein when said motion displacement map is d(t) and $x^r(t)$ is a reference motion, the new motion information x(t) is obtained by adding $x(t) = x^r(t) + d(t)$ and calculating from mathematical equation 20;

$$x(t) = \begin{bmatrix} 0_3 \\ q_1^r(t) \\ \vdots \\ q_n^r(t) \end{bmatrix} \oplus \begin{bmatrix} 0_3 \\ v_1(t) \\ \vdots \\ v_n(t) \end{bmatrix} = \begin{bmatrix} 0_3 \\ q_1^r(t)\exp(v_1(t)) \\ \vdots \\ q_n^r(t)\exp(v_n(t)) \end{bmatrix}.$$

* * * * *